(12) United States Patent
Oda

(10) Patent No.: US 12,717,527 B2
(45) Date of Patent: Aug. 25, 2026

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventor: Yuichiro Oda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 18/776,369

(22) Filed: Jul. 18, 2024

(65) Prior Publication Data

US 2025/0036325 A1 Jan. 30, 2025

(30) Foreign Application Priority Data

Jul. 24, 2023 (JP) ................................ 2023-119722

(51) Int. Cl.
*H04N 1/04* (2006.01)
*G06F 3/12* (2006.01)

(52) U.S. Cl.
CPC .......... *G06F 3/1205* (2013.01); *G06F 3/1255* (2013.01)

(58) Field of Classification Search
USPC ................................................... 358/449, 1.2
See application file for complete search history.

(56) References Cited

U.S. PATENT DOCUMENTS

2007/0195336 A1* 8/2007 Uotani .................. G06F 3/1246 358/1.1
2015/0055175 A1* 2/2015 Lida ...................... G06F 3/1205 358/1.15
2022/0171582 A1* 6/2022 Higashi ................. G06F 3/1208

FOREIGN PATENT DOCUMENTS

JP 2004-318817 A 11/2004

* cited by examiner

*Primary Examiner* — Cheukfan Lee
(74) *Attorney, Agent, or Firm* — VENABLE LLP

(57) ABSTRACT

A printing apparatus an obtaining unit configured to obtain a print job including first sheet information and margin information from an information processing apparatus, the first sheet information indicating a dimension of a sheet to be used in printing, the margin information indicating whether to provide a margin region in the printing, and a determination unit configured to, in a case where the first sheet information and second sheet information indicating a dimension of a sheet set on a printing apparatus do not match, make a determination on whether the printing is possible based on region information indicating a printable region and the second sheet information, the printable region being based on the margin information.

12 Claims, 13 Drawing Sheets

SHEET MISMATCH FUNCTION SETTING SCREEN

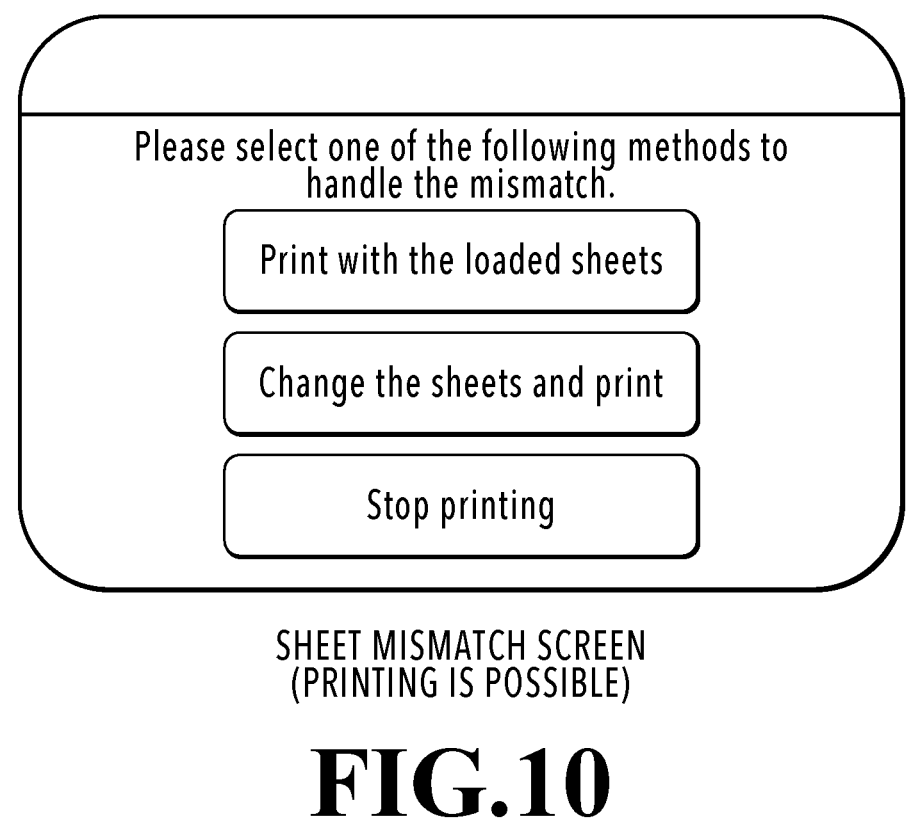

Please select one of the following methods to handle the mismatch.

Print with the loaded sheets

Change the sheets and print

Stop printing

SHEET MISMATCH SCREEN
(PRINTING IS POSSIBLE)

FIG.10

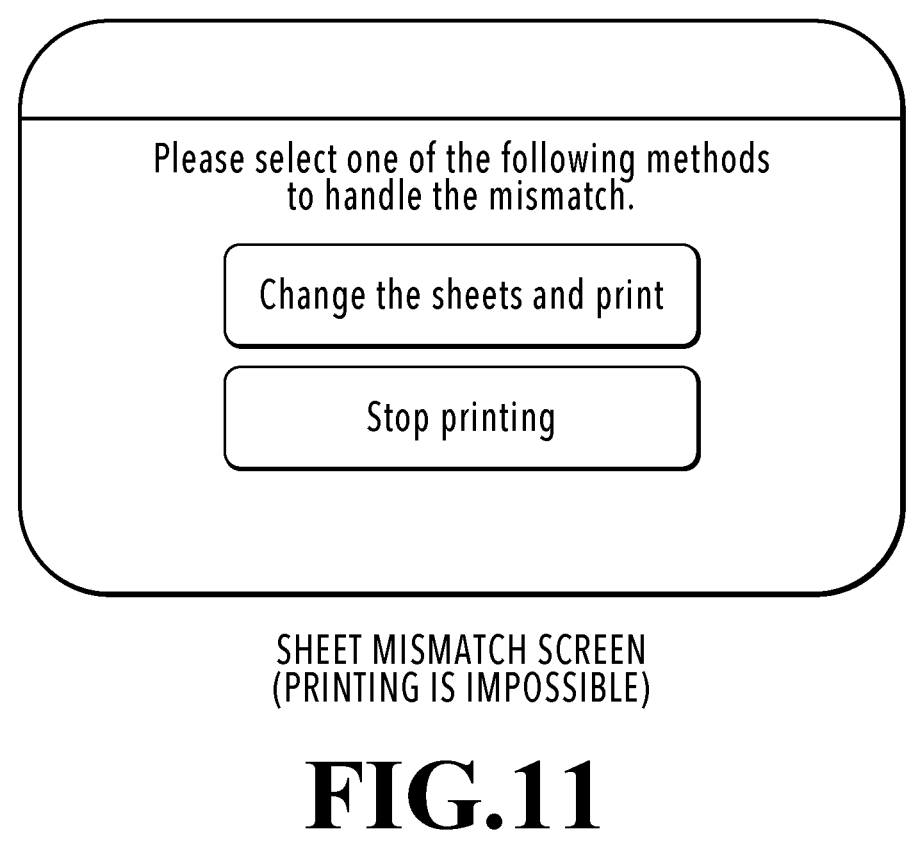

Please select one of the following methods to handle the mismatch.

Change the sheets and print

Stop printing

SHEET MISMATCH SCREEN
(PRINTING IS IMPOSSIBLE)

FIG.11

| | | | HOST-SIDE SETTING | | | | | | | | | | |
|---|---|---|---|---|---|---|---|---|---|---|---|---|---|
| | | | B5 | Executive | reply-paid postcard | 6P (8"×10") | A4 | FS | Foolscap | Letter | Legal | B-OFICIO | M-OFICIO |
| | | | 175.2 | 177.4 | 193.2 | 196.4 | 203.2 | 203.2 | 203.2 | 203.2 | 203.2 | 203.2 | 203.2 |
| PRINTING APPARATUS-SIDE SETTING | B5 | 182.0 | ○ | ○ | | | | | | | | | |
| | Executive | 184.2 | ○ | ○ | | | | | | | | | |
| | reply-paid postcard | 200.0 | ○ | ○ | ○ | ◎ | | | | | | | |
| | 6P (8"×10") | 203.2 | ○ | ○ | ○ | ○ | ◎ | ◎ | ◎ | ◎ | ◎ | ◎ | ◎ |
| | A4 | 210.0 | ○ | ○ | ○ | ○ | ○ | ◎ | ◎ | ◎ | ◎ | ◎ | ◎ |
| | FS | 215.0 | ○ | ○ | ○ | ○ | ○ | ○ | ◎ | ◎ | ◎ | ◎ | ◎ |
| | Foolscap | 215.9 | ○ | ○ | ○ | ○ | ○ | ○ | ○ | ○ | ○ | ◎ | ◎ |
| | Letter | 215.9 | ○ | ○ | ○ | ○ | ○ | ○ | ○ | ○ | ○ | ◎ | ◎ |
| | Legal | 215.9 | ○ | ○ | ○ | ○ | ○ | ○ | ○ | ○ | ○ | ◎ | ◎ |
| | B-OFICIO | 216.0 | ○ | ○ | ○ | ○ | ○ | ○ | ○ | ○ | ○ | ○ | ○ |
| | M-OFICIO | 216.0 | ○ | ○ | ○ | ○ | ○ | ○ | ○ | ○ | ○ | ○ | ○ |

FIG.12

PRINTING APPARATUS, METHOD OF CONTROLLING PRINTING APPARATUS, AND STORAGE MEDIUM

BACKGROUND OF THE INVENTION

Field of the Invention

The present disclosure relates to a technique for performing processing that is based on a print job.

Description of the Related Art

Some inkjet printers intended for personal use are not equipped with a mechanism to load multiple types of print sheets as printable sheets or a function of detecting the type, size, and the like of the sheets loaded in the printer. On the other hand, regarding the types of print sheets, not only plain paper but various types of sheets, such as glossy paper and photographic paper, have been used due to the spread of digital cameras, the improvement in the image quality of inkjet printers, and so on.

Japanese Patent Laid-Open No. 2004-318817 proposes a system which, in a case where a printing apparatus is loaded with sheets of a size that is different from an actual sheet size desired to be used, notifies the user of a possibility of a sheet mismatch.

There has been a demand for a technique that enables printing to be executed as much as possible even in a case where a sheet mismatch occurs.

SUMMARY OF THE INVENTION

A printing apparatus according to an aspect of the present disclosure includes: an obtaining unit configured to obtain a print job including first sheet information and margin information from an information processing apparatus, the first sheet information indicating a dimension of a sheet to be used in printing, the margin information indicating whether to provide a margin region in the printing; and a determination unit configured to, in a case where the first sheet information and second sheet information indicating a dimension of a sheet set on the printing apparatus do not match, makes a determination on whether the printing is possible based on region information indicating a printable region and the second sheet information, the printable region being based on the margin information.

Further features of the present invention will become apparent from the following description of exemplary embodiments with reference to the attached drawings.

BRIEF DESCRIPTION OF THE DRAWINGS

FIG. 10 is a diagram illustrating an example of a sheet mismatch screen in a case where forced continuation is possible;

FIG. 11 is a diagram illustrating an example of a sheet mismatch screen in a case where forced continuation is impossible; and FIG. 12 is a table illustrating an example of patterns with which printing is possible.

DESCRIPTION OF THE EMBODIMENTS

A preferred embodiment of the present disclosure will be specifically described below with reference to the accompanying drawings. Note that the following embodiment does not limit the contents of the present disclosure, and not all of the combinations of the features described in the following embodiment are necessarily essential for the solution provided by the present disclosure. Incidentally, the same elements will be described with the same reference sign given thereto.

First Embodiment

Figure 1:
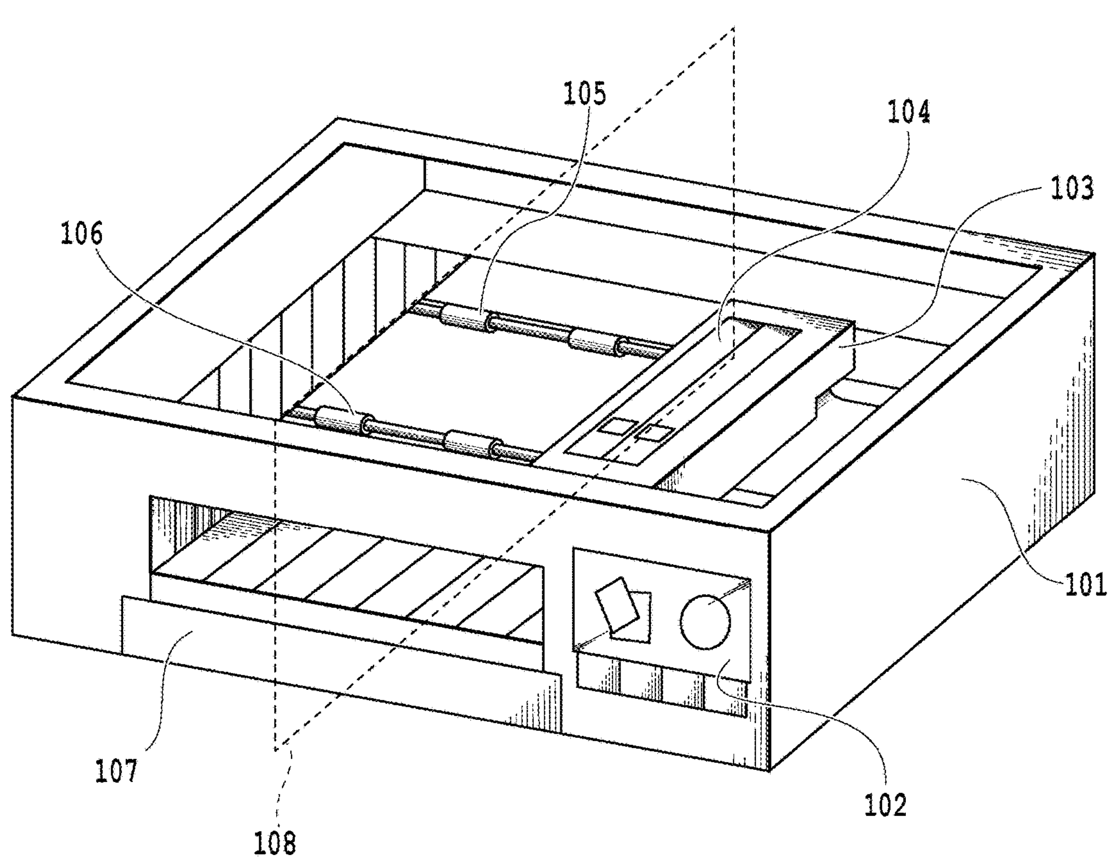
FIG. 1 is a perspective view illustrating an example of a printing apparatus.

FIG. 1 is a perspective view illustrating an example of the configuration of a printing apparatus 101 according to the present disclosure. A structure of the printing apparatus 101 will now be described with reference to FIG. 1. The printing apparatus 101 has an operation unit 102, a carriage 103, ink tanks 104, conveyance rollers 105, sheet discharge rollers 106, and a sheet feed port 107. Incidentally, the printing method of the printing apparatus used in the present embodiment may be an electrophotographic method, an inkjet method, or another method. The printing apparatus 101 used in the present embodiment is an apparatus capable of performing continuous printing. The operation unit 102 is an operation region which the user can operate to power on and off the printing apparatus 101 and change print settings, print sheet settings, and the like. The operation unit 102 has a liquid crystal display device, operation keys, and the like, and accepts instructions from the user. The operation unit 102 displays images on the liquid crystal display device to, for example, notify the user of the state of the printing apparatus 101 and prompt the user to designate a process to be executed by the printing apparatus 101. The liquid crystal display device may have a touch panel function. The carriage 103 is capable of moving in a direction crossing the conveyance direction of print media. The carriage 103 is a printing unit that forms an image on a conveyed print medium by ejecting inks while moving over the print medium. The ink tanks 104 are storage units for the inks with which to form images on print media. The conveyance rollers 105 are a conveyance unit that conveys a print medium. The sheet discharge rollers 106 are a sheet discharge unit that conveys a print medium on which an image is formed. The sheet feed port 107 is a sheet feed unit that feeds print media.

Figure 2:
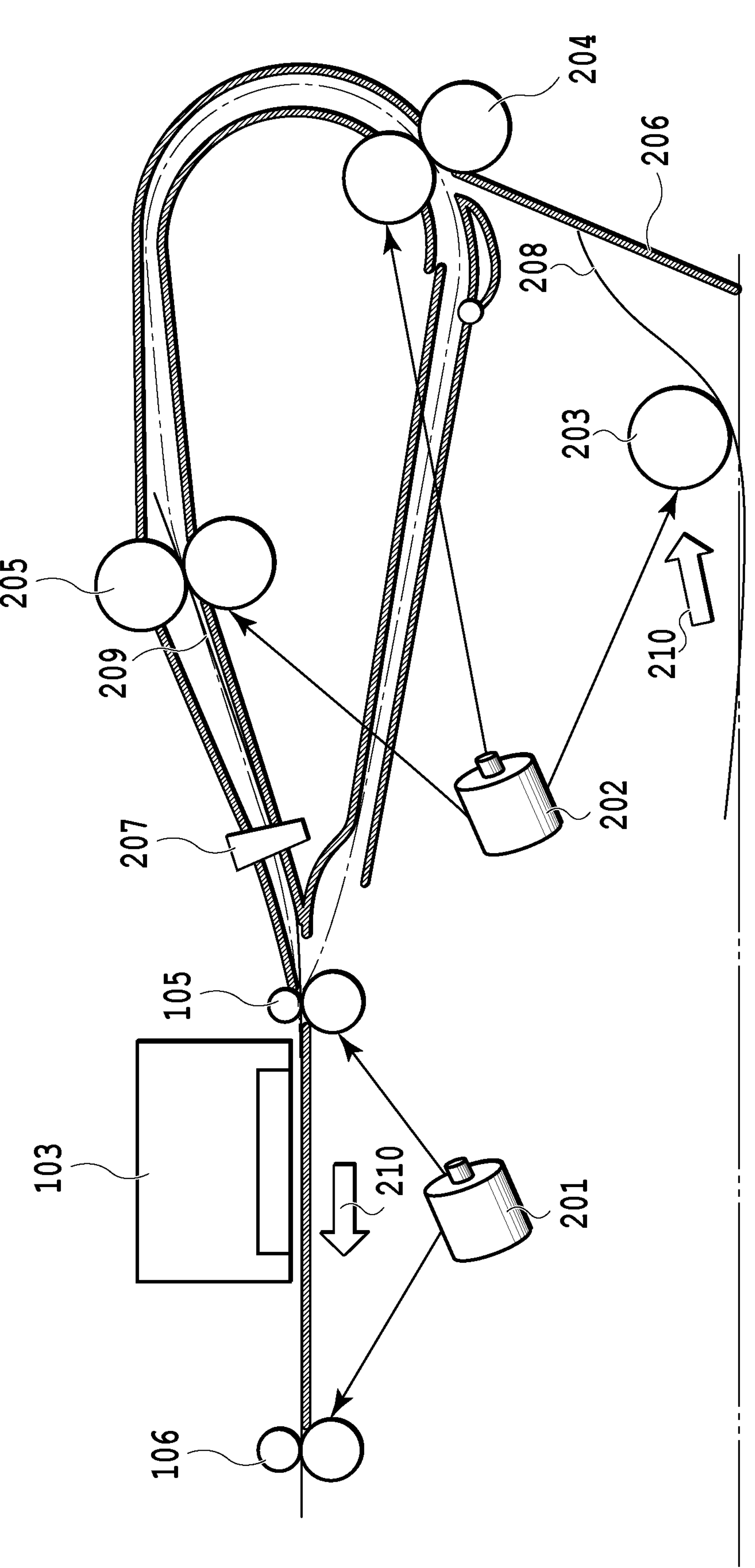
FIG. 2 is a cross-sectional view illustrating an example of the printing apparatus.

FIG. 2 is a cross-sectional view illustrating an example of the printing apparatus 101 as seen from a direction perpendicular to a plane 108 illustrated with the dotted line in FIG. 1. A sheet feed structure of the printing apparatus 101 will now be described with reference to FIG. 2. The printing apparatus 101 has a conveyance motor 201, a sheet feed motor 202, a sheet feed roller 203, intermediate rollers 204 and 205, an inclined portion 206, and a detection sensor 207. The conveyance motor 201 is a motor that rotates the conveyance rollers 105 and the sheet discharge rollers 106. The sheet feed motor 202 is a motor that rotates the sheet feed roller 203 and the intermediate rollers 204 and 205. The sheet feed roller 203 and the intermediate rollers 204 and 205 are rollers that are rotated by driving the sheet feed motor 202 and convey a print medium 208 in a direction 210 with the rotational movements. The inclined portion 206 is an inclined surface provided to allow the print medium 208 conveyed by the sheet feed roller 203 to reach the intermediate rollers 204. The detection sensor 207 is a sensor that detects a print medium 209 conveyed by the intermediate rollers 205.

The printing apparatus 101 drives the sheet feed roller 203 by driving the sheet feed motor 202 to feed print media 208 one by one from the sheet feed port 107, in which the print media 208 can be loaded. Each print medium 208 conveyed by the sheet feed roller 203 moves upward along the inclined portion 206 to reach the intermediate rollers 204. Also, by driving the sheet feed motor 202, the printing apparatus 100 rotates the intermediate rollers 204 and 205 so as to convey the print medium 208 in the direction 210. The printing apparatus 100 detects the print medium 208 conveyed by the intermediate rollers 205 with the detection sensor 207. After the detection, the printing apparatus 100 calculates the position of the leading edge of the print medium 208 from the driving amounts of the sheet feed motor 202 and the conveyance motor 201. By driving the conveyance motor 201, the printing apparatus 100 rotates conveyance rollers 105 and the sheet discharge rollers 106 so as to convey the print medium 209 in the direction 210 and convey the print medium 209 to under the carriage 103. The printing apparatus 101 then moves the carriage 103 carrying the ink tanks 104 in a direction crossing the conveyance direction of the print medium 209 (direction perpendicular to the sheet of FIG. 2) and causes the carriage 103 to eject the inks to thereby form an image on the print medium (hereinafter this operation will be referred to as "printing"). The sheet feed roller 203, the intermediate rollers 204, the intermediate rollers 205, the conveyance rollers 105, and the sheet discharge rollers 106 are disposed in this order from the sheet feed port 107. In the present embodiment, there are three types of rollers that can be driven by the sheet feed motor 202, but the number of rollers may be changed according to the length of the conveyance path or the length of the print medium to be handled. Further, the description has been given based on an example in which the printing apparatus 101 is configured to convey a print medium with two motors, namely the sheet feed motor 202 and the conveyance motor 201. Alternatively, the printing apparatus 101 may be configured to use a single motor and switch the rollers to be driven. The printing apparatus 100 is capable of driving the sheet feed motor 202 during the printing of the print medium 209 to feed the next print medium 208. Feeding the next print medium 208 during the printing of the print medium 209, which has started being printed earlier, improves the print rate.

Figure 3:
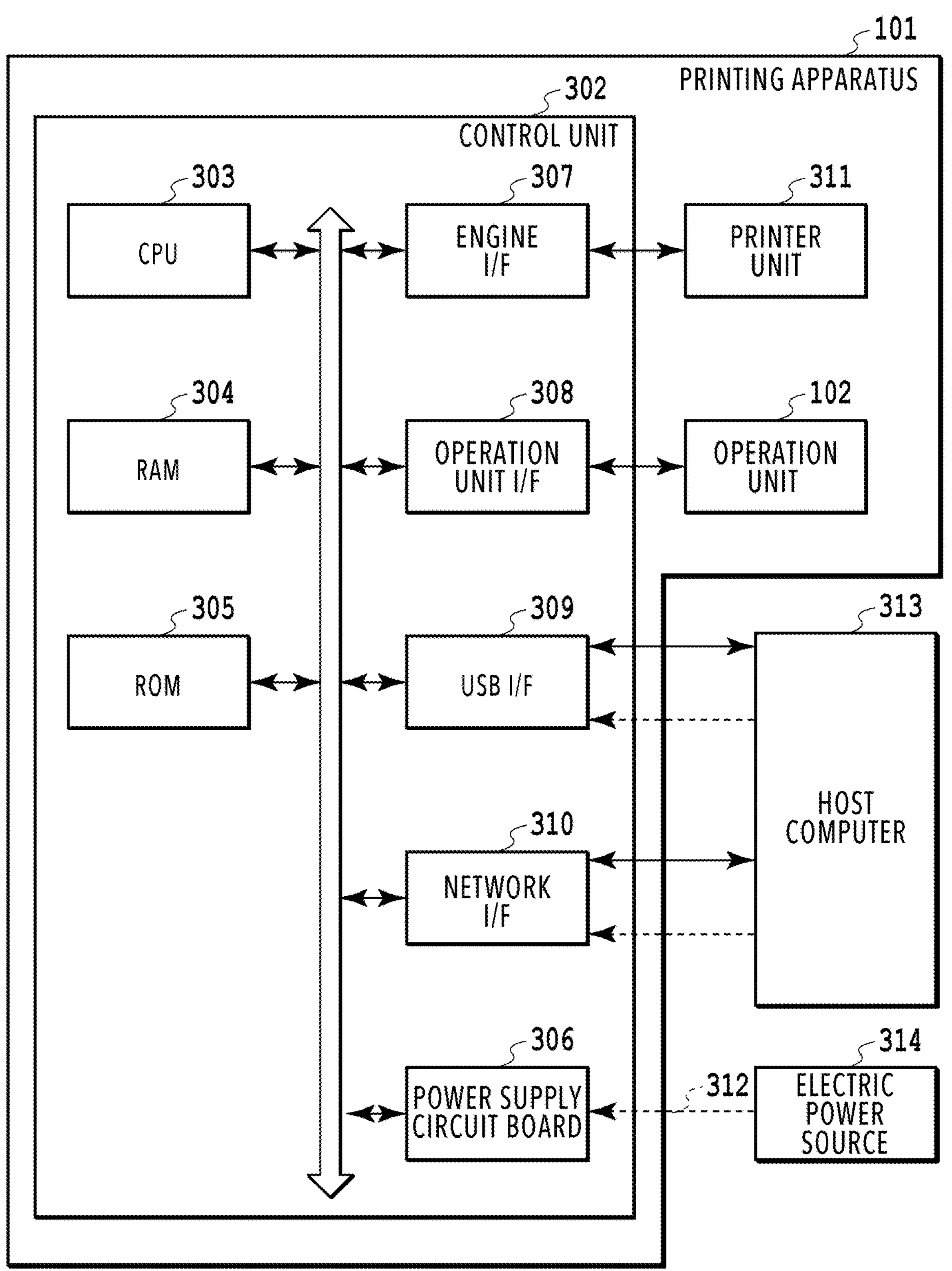
FIG. 3 is a diagram illustrating an example of the hardware configuration of the printing apparatus.

FIG. 3 is a block diagram illustrating an example of the hardware configuration of the printing apparatus 101 in the embodiment of the present disclosure. The hardware configuration of the printing apparatus 101 will now be described with reference to FIG. 3. Note that description of the elements described above is omitted. The printing apparatus 101 has a control unit 302, a printer unit 311, and the operation unit 102. The control unit 302 includes a central processing unit (CPU) 303, a random access memory (RAM) 304, and a read only memory (ROM) 305. The control unit 302 has a power supply circuit board 306, an engine interface (I/F) 307, an operation unit I/F 308, a universal serial bus (USB) I/F 309, and a network I/F 310. The CPU 303 is a central processing unit, and executes various types of control by loading control programs stored in the ROM 305 to the RAM 304 and reading them out. The RAM 304 is a primary memory for the CPU 303 and used as a work area and a temporary storage area to load the various programs stored in the ROM 305. The ROM 305 is a non-volatile storage medium and stores image data, the various programs, and information of various settings, such as sheet settings. Also, in the embodiment of the present disclosure, the ROM 305 is considered to be a flash storage or the like, but may be an auxiliary storage device such as a hard disk drive (HDD). Note that a single CPU 303 uses a single memory (RAM 304) to execute the processes in the later-described flowcharts, but another configuration may be employed. For example, multiple CPUs and multiple RAMs, ROMs, and storages can be caused to cooperate with one another to execute the processes illustrated in the later-described flowcharts. Alternatively, a hardware circuit may be used to execute some of the processes. The power supply circuit board 306 transforms electric power supplied from an electric power source 314 through a power supply cable 312 and supplies the resulting electric power to the printing apparatus 101. Also, the power supply circuit board 306 may include a rechargeable battery capable of storing electric power. The engine I/F 307 is an interface that connects the printer unit 311 and the control unit 302. The operation display unit I/F 308 connects the operation unit 102 and the control unit 302. The USB I/F 309 and the network I/F 310 control communication with a host computer 313 connected to the printing apparatus 101. The printer unit 311 obtains image data from the control unit 302 through the engine I/F 307 and prints that image data on a print medium, such as paper. The host computer 313 is an information processing apparatus that receives and transmits data and/or control information and displays image data. The host computer 313 may be a personal computer (PC), a smartphone, or a tablet terminal. The printing apparatus 101 obtains setting information of print jobs from the host computer 313 through the USB I/F 309 and/or the network I/F 310. The above is the hardware configuration of the printing apparatus 101.

Figure 4:
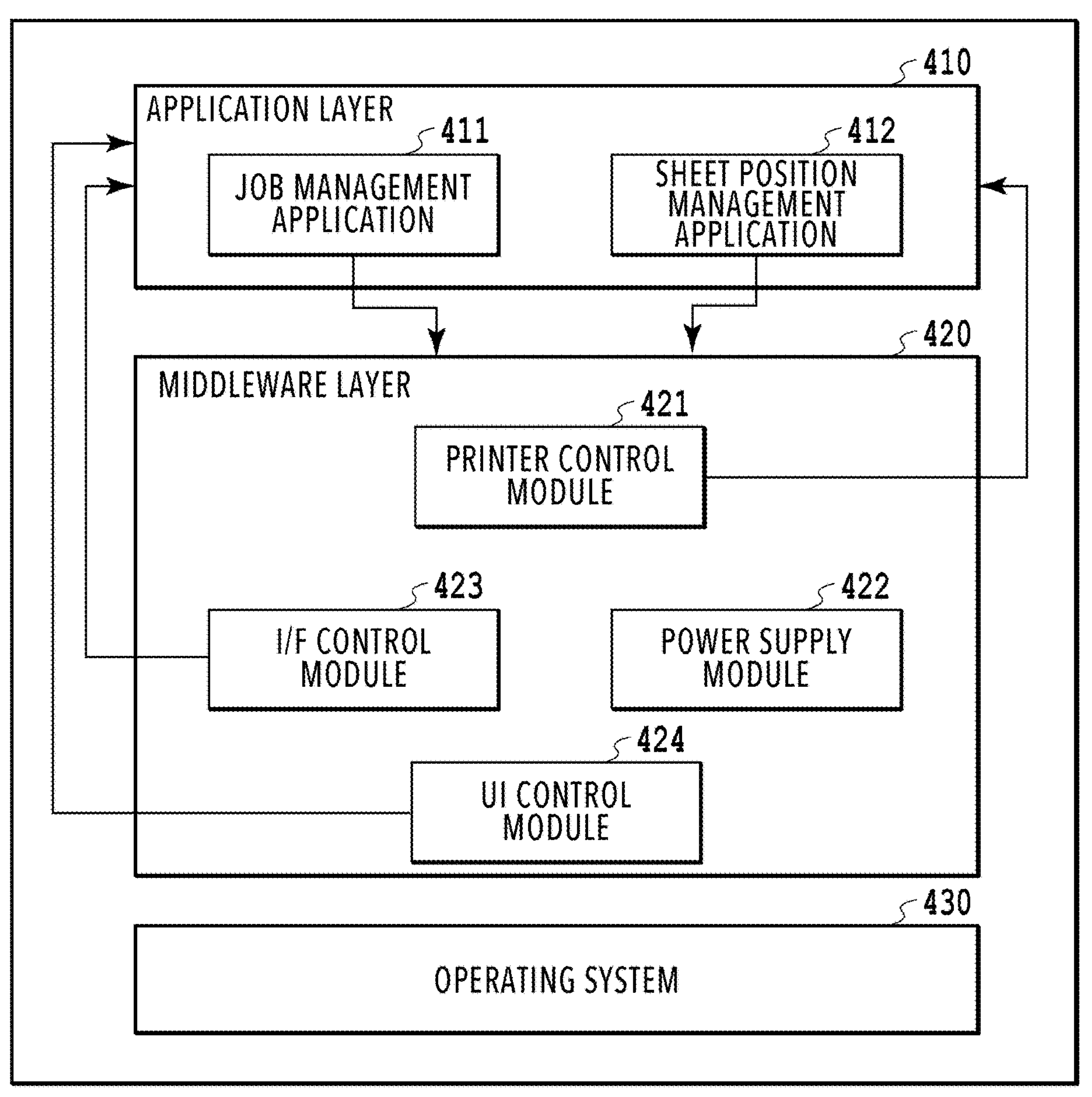
FIG. 4 is a diagram illustrating an example of the software configuration of the printing apparatus.

FIG. 4 is a diagram illustrating an example of the software configuration of a control program loaded to the RAM 304 in the embodiment of the present disclosure for controlling hardware modules. The software configuration of the printing apparatus 101 will now be described with reference to FIG. 4.

As illustrated in FIG. 4, the software of the control program for the printing apparatus 101 is mainly divided into three layers. The three layers refer to an application layer 410 that manages applications, a middleware layer 420 that controls the apparatus through the various I/Fs, and an operating system 430 that manages comprehensive control. Each layer's role will now be discussed. The operating system 430 provides fundamental functions for the control unit 302 to execute the control program. The middleware layer 420 includes a software group that controls the I/Fs of the control unit 302 and physical devices. The middleware layer 420 has a printer control module 421, an I/F control module 423, a power supply module 422, and an UI control module 424. The printer control module 421 controls the engine I/F 307. The I/F control module 423 controls the USB I/F 309 and the network I/F 310, which are used for communication with the host computer 313. The UI control module 424 controls the operation unit I/F 308. The power supply module 422 controls the power supply circuit board 306. The application layer 410 has a job management application 411 and a sheet position management application 412. The application layer 410 implements functions which the printing apparatus 101 provides to the user, such as printing, by causing the I/Fs of the control unit 302 and devices to operates through the modules in the middleware layer 420.

For example, the UI control module 424 detects an operation to start printing on the operation unit 102 by the user through the operation unit I/F 308. The UI control module 424 then notifies the application layer 410 of that effect. In response to the notification, the application layer 410 causes the job management application 411 to start processing for performing printing. The job management application 411 causes the printer unit 311 to executes a printing operation by using the printer control module 421 in the middleware layer 420. The sheet position management application 412 controls the printer unit 311 by using the printer control module 421 in the middleware layer 420 to manage the position of the leading edge of a print medium in the printing apparatus. Specifically, the sheet position management application 412 calculates position of the leading edge of the print medium 209 from the timing at which the print medium 209 is detected by the detection sensor 207 and the driving amounts of the sheet feed motor 202 and the conveyance motor 201. By calculating the position of the leading edge of the print medium 209, it is possible to calculate the position of the trailing edge of the print medium 209 from its sheet length and to predict the position of the leading edge of the next print medium 208 from the driving amount of the sheet feed motor 202.

Figure 5:
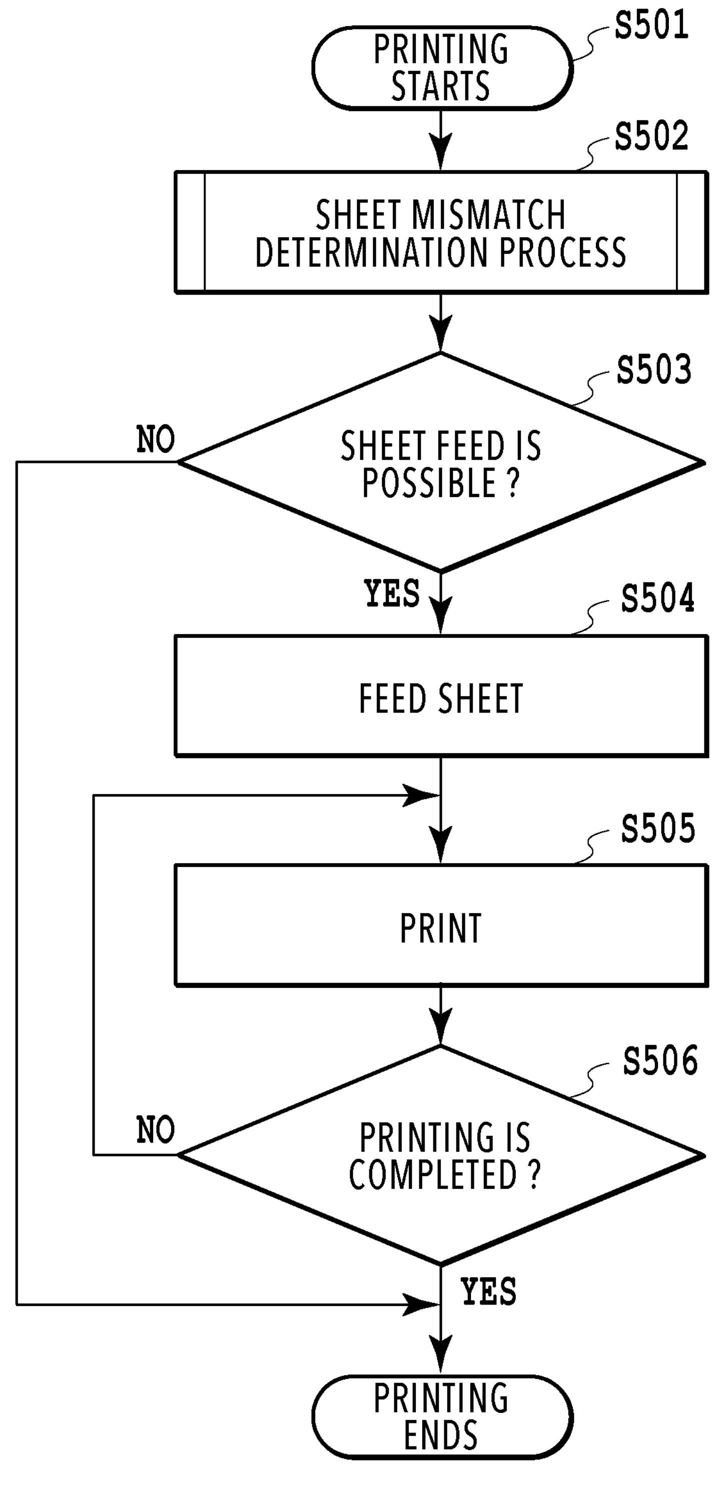
FIG. 5 is a flowchart illustrating an example of print processing.

FIG. 5 is a flowchart illustrating an example of print processing by the printing apparatus according to the present embodiment. The print processing by the printing apparatus 101 will now be described with reference to FIG. 5. The CPU 303 of the printing apparatus 101 implements the processing illustrated in FIG. 5 by loading a program stored in the ROM 305 to the RAM 304 and executing it. Incidentally, the functions of some or all of the steps in FIG. 5 may be implemented with hardware such as an application-specific integrated circuit (ASIC) or an electronic circuit. The symbol “S” in the description of each process means a step in the flowchart (the same applies to the other flowcharts herein). The processing of this flowchart is started in response to an instruction to start printing into the printing apparatus 101. The CPU 303 receives a print job from the host computer 313 by controlling the USB I/F 309 and/or the network I/F 310 with the I/F control module 423. The CPU 303 then notifies the job management application 411 of the print job with the I/F control module 423. The CPU 303 notifies the printer control module 421 of the start of the job with the job management application 411.

In S501, the CPU 303 control the printer unit 311 through the engine I/F 307 to start the print processing. The CPU 303 then proceeds to the process of S502. In S502, the CPU 303 executes a sheet mismatch determination process to be described later with reference to FIG. 6 on the print media in the sheet feed port 107 before feeding a print medium. The CPU 303 then proceeds to the process of S503. In S503, the CPU 303 determines whether sheet feed is possible. If determining that sheet feed is possible (Yes), the CPU proceeds to the process of S504 and, if not (No), terminates the print processing.

In S504, the CPU 303 executes a sheet feed process. Specifically, the CPU 303 controls the printer unit 311 through the engine I/F 307 to drive the sheet feed motor 202. As the printer unit 311 drives the sheet feed motor 202, the sheet feed roller 203, the intermediate rollers 204, and the intermediate rollers 205 rotate so as to convey a print medium in the direction 210. The CPU 303 controls the printer unit 311 as described above to feed a print medium. The CPU 303 then proceeds to the process of S505.

In S505, the CPU 303 executes a printing process. Specifically, the CPU 303 instructs the printer control module 421 to perform printing with the job management application 411 after the print medium feed in S504 reaches the detection sensor 207. The CPU 303 then controls the printer unit 311 through the engine I/F 307 with the printer control module 421 to drive the conveyance motor 201. As the printer unit 311 drives the conveyance motor 201, the conveyance rollers 105 and the sheet discharge rollers 106 rotate so as to convey the print medium in the direction 210. The CPU 303 then controls the carriage 103 of the printer unit 311 through the engine I/F 307 with the printer control module 421 while conveying the print medium as described above to perform printing. The CPU 303 then proceeds to the process of S506.

In S506, the CPU 303 determines whether the printing has been completed. If determining that the printing has been completed (Yes), the CPU 303 terminates the print processing and, if not (No), proceeds to S505 again. Specifically, the CPU 303 continues the process of S505 with the printer control module 421 until the printing for the fed print medium ends.

Figure 6:
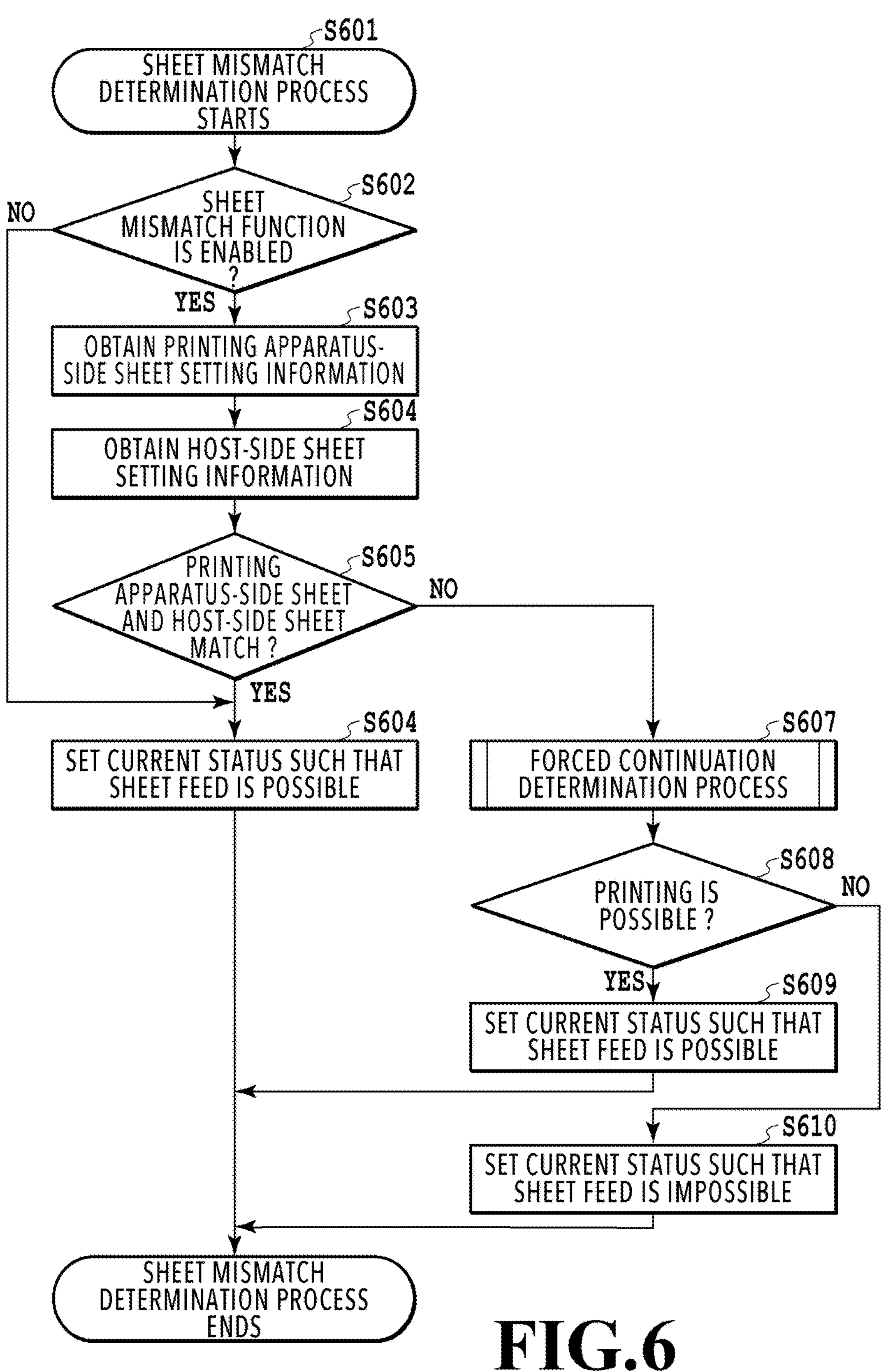
FIG. 6 is a flowchart illustrating an example of a sheet mismatch determination process.

FIG. 6 is a flowchart illustrating an example of the sheet mismatch determination process in S502. Details of the sheet mismatch determination process executed by the printing apparatus 101 will now be described with reference to FIG. 6. The CPU 303 of the printing apparatus 101 implements the processing illustrated in FIG. 6 by loading a program stored in the ROM 305 to the RAM 304 and executing it. The processing of this flowchart is started before the print medium is fed from the sheet feed port 107.

Figure 7:
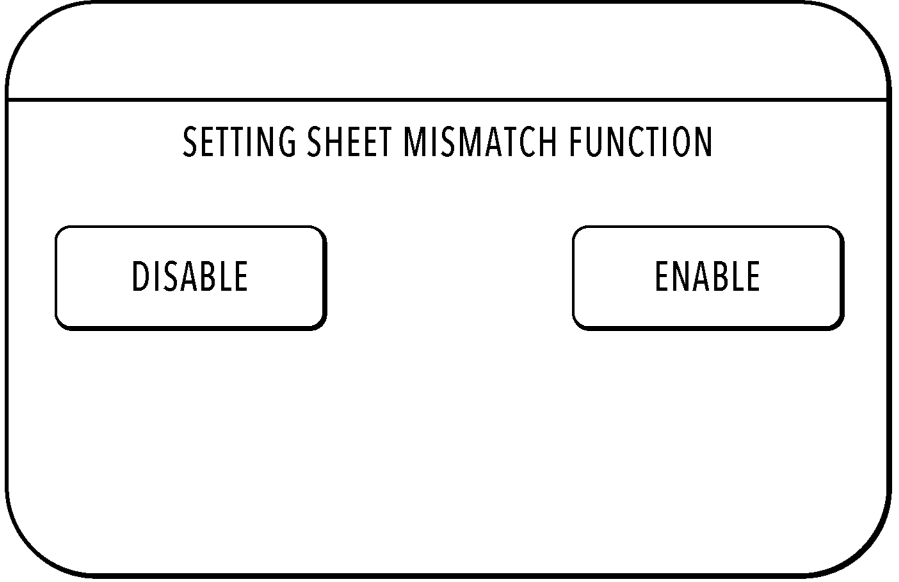
FIG. 7 is a diagram illustrating an example of a setting screen for a sheet mismatch function.

In S601, the CPU 303 starts the sheet mismatch determination process after the process of S501. In S602, the CPU 303 determines whether a sheet mismatch function is enabled. The CPU 303 proceeds to the process of S603 if determining that the sheet mismatch function is enabled (Yes) and, if not (No), proceeds to the process of S606. Incidentally, the user can enable and disable the sheet mismatch function by operating a screen as illustrated in FIG. 7 to be mentioned later which is displayed on the display unit (not illustrated) of the operation unit 102 or the host computer 313.

In S603, the CPU 303 obtains sheet setting information of the printing apparatus 101 (second sheet information). Specifically, if determining in S602 that the sheet mismatch function is enabled, the CPU 303 obtains the second sheet information from the job management application 411 with the printer control module 421. The CPU 303 then proceeds to the process of S604. The second sheet information set on the printing apparatus 101 (hereinafter referred to as “printing apparatus side”) includes sheet size information and sheet type information. The sheet size information is information indicating the dimensions of sheets. Specifically, the sheet size information is information of the size of the sheets indicating the sheet width and the sheet length. For example, the sheet size is an A4 sheet is 210 mm (sheet width)×297 mm (sheet length). Note that the sheet size information is not limited to the information indicating the sheet width and the sheet length, and may be information on the standard of the sheet size, such as A4 or Letter. The sheet type information is information indicating the type of the sheets. Examples of the type of the sheets include B5, Executive, reply-paid postcard, 6P, A4, FS, Foolscap, Letter, Legal, B-OFICIO, M-OFICIO, and so on.

In S604, the CPU 303 obtains sheet setting information of the host computer 313, which is included in the print job. Specifically, the CPU 303 obtains the sheet setting information from the job management application 411 with the printer control module 421. The CPU 303 then proceeds to the process of S605. The sheet setting information set on the host computer 313 (hereinafter referred to as "host side") includes sheet size information and sheet type information (first sheet information), margin information indicating bordered printing or borderless printing, and information of the maximum print width. The sheet size information and the sheet type information are similar to those described above, and description thereof is therefore omitted. The margin information is information indicating whether to perform printing with a margin region formed around the print medium to be printed. In a case where bordered printing is set as the margin information, the margin information includes margin width information. The margin width information is information indicating the width of the margin region (margin width), which will not be printed, from the outer periphery of the set sheet size. For example, in a case where bordered printing using A4 as the sheet type with a margin width of 5 mm on the top, bottom, left, and right is set as the sheet setting information, the print region on the A4 (210 mm×297 m) print medium is 200 mm×287 mm. The information of the maximum print width is information indicating the length of one side of the printable region on the print medium that can be printed (region information). Specifically, the maximum print width is a value derived by subtracting the margin width from the set sheet width. For example, the maximum print width is 200 mm in a case where bordered printing using A4 as the sheet type with a margin width of 5 mm on the left and right is set as the sheet setting information. In other words, the maximum print width varies according to the margin width setting. Incidentally, in a case of a printing system for which only one margin region width (margin width) or one set of margin region widths is set, the margin information does not necessarily have to include information of the margin region width(s) (margin width(s)), and only needs to be information indicating whether a margin is set.

In S605, the CPU 303 determines whether the second sheet information obtained in S603 and the first sheet information obtained in S604 match. That is, in S605, the CPU 303 determines whether the printing apparatus-side sheet and the host-side sheet match. The CPU 303 proceeds to the process of S606 if determining that the sheets match (Yes) and, if not (No), proceeds to the process of S607. Specifically, the CPU 303 compares the sheet size information and the sheet type information included in the first sheet information and those in the second sheet information and determines whether each type of information matches. The CPU 303 compares the printing apparatus-side sheet size information and the host-side sheet size information. For example, the CPU 303 determines that the sheet sizes match if the printing apparatus-side sheet size is 216 mm×279 mm and the host-side sheet size is 216 mm×279 mm. On the other hand, the CPU 303 determines that the sheet sizes do not match if the printing apparatus-side sheet size is 216 mm×279 mm and the host-side sheet size is 216 mm×356 mm. In sum, in this determination, the CPU 303 compares both the sheet widths and the sheet lengths. The CPU 303 also compares the printing apparatus-side sheet type information and the host-side sheet type information. For example, the CPU 303 determines the sheet types match if the printing apparatus-side sheet type is A4 and the host-side sheet type is A4. On the other hand, the CPU 303 determines the sheet types do not match if the printing apparatus-side sheet type is A4 and the host-side sheet type is B4. The CPU 303 determines the sheets match if both the sheet size information and the sheet type information of the printing apparatus 101 and those of the host computer 313 match as above. Otherwise, the CPU 303 determines that the sheets do not match.

In S606, the CPU 303 sets the current status such that sheet feed is possible, and terminates the sheet mismatch determination process. In S607, the CPU 303 executes a forced continuation determination process in FIG. 8A and FIG. 8B to be described later. The CPU 303 then proceeds to the process of S608. In S608, the CPU 303 determines whether printing is possible. The CPU 303 proceeds to the process of S609 if determining that printing is possible (Yes) and, if not (No), proceeds to the process of S610. In S609, the CPU 303 sets the current status such that sheet feed is possible, and terminates the sheet mismatch determination process. In S610, the CPU 303 sets the current status such that sheet feed is impossible, and terminates the sheet mismatch determination process.

FIG. 7 is a diagram illustrating an example of a setting screen for the sheet mismatch function displayed on the operation unit 102 of the printing apparatus 101. The setting of the sheet mismatch function will now be described with reference to FIG. 7. The setting screen in FIG. 7 has an "enable" button and a "disable" button. The "enable" button is a control for enabling the sheet mismatch function with the user's operation. In a case of executing print processing, the CPU 303 executes the sheet mismatch determination in S605 as described earlier if the sheet mismatch function is enabled by the user's operation. The "disable" button is a control for disabling the sheet mismatch function with the user's operation. In a case of executing print processing, the CPU 303 does not execute the sheet mismatch determination in S605 if the sheet mismatch function is disabled by the user's operation. Incidentally, the CPU 303 may send screen data of the setting screen for the sheet mismatch function to the host computer 313 in order to display the setting screen for the sheet mismatch function on the display unit of the host computer 313 and allow the user to configure the setting of the sheet mismatch function. Then, from the host computer 313, the CPU 303 may receive setting information indicating whether to enable or disable to the sheet mismatch function that is based on the operation on the display unit of the host computer 313. In this way, the user can set whether to enable or disable the sheet mismatch function on the host computer 313 without having to operate the operation unit 102 of the printing apparatus 101.

Figure 8A:
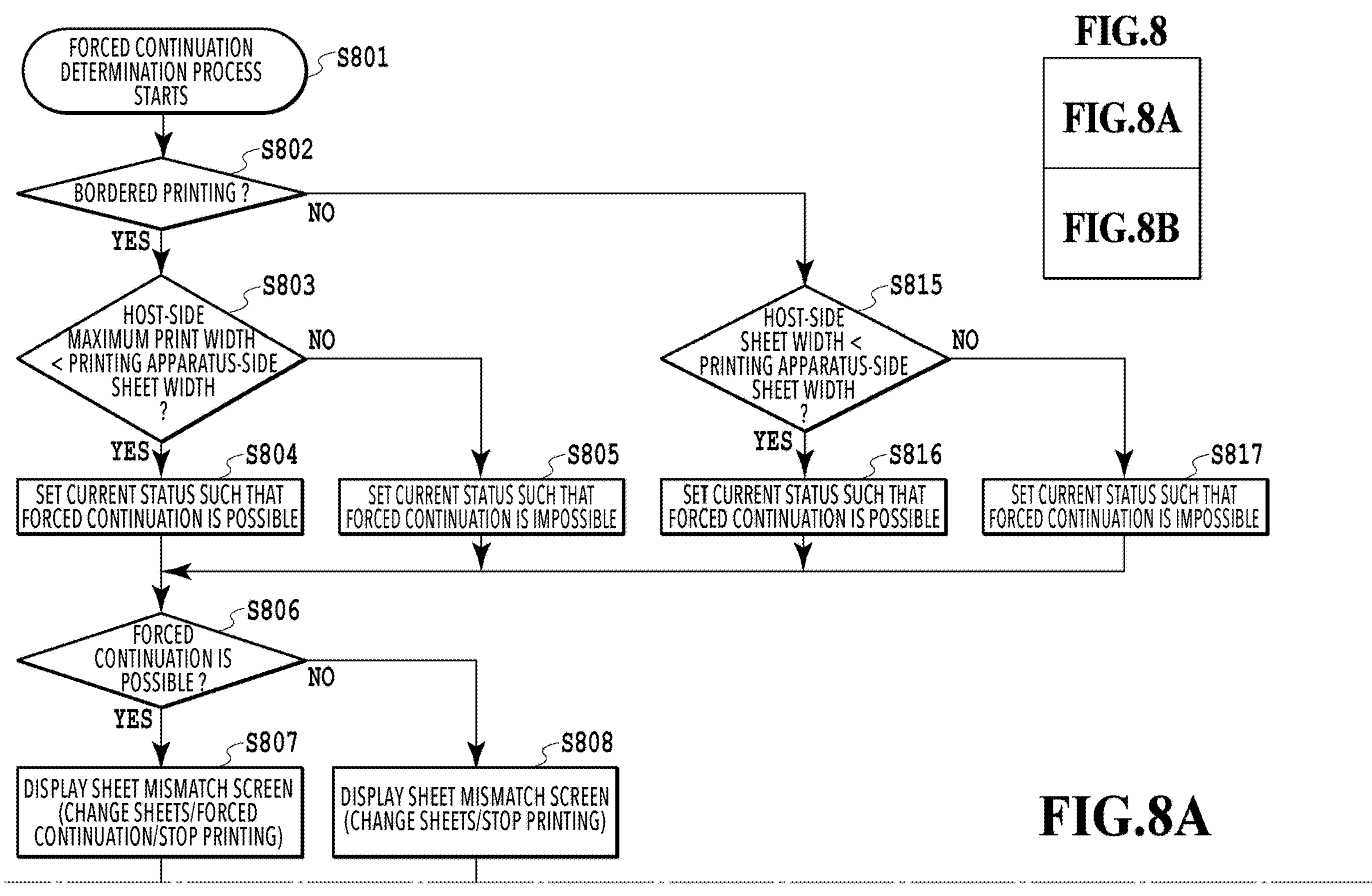
FIG. 8 is a diagram showing the relationship of FIG. 8A and FIG. 8B, and FIG. 8A and FIG. 8B are a flowchart illustrating an example of a forced continuation determination process.
Figure 8B:
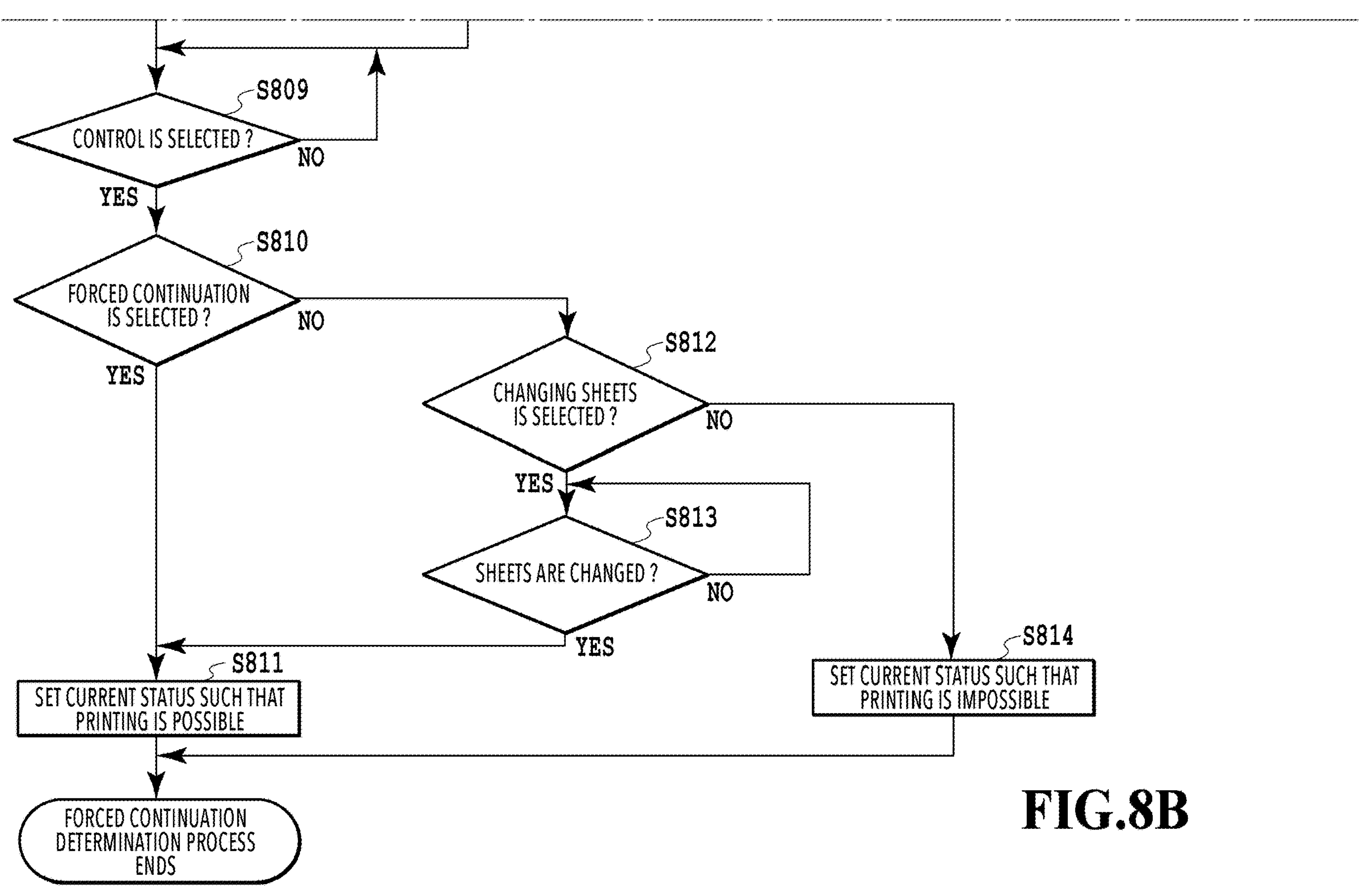

FIG. 8A and FIG. 8B are a flowchart illustrating an example of the forced continuation determination process in S607. Details of the forced continuation determination process will now be described with reference to FIG. 8A and FIG. 8B. The CPU 303 of the printing apparatus 101 implements the processing illustrated in FIG. 8A and FIG. 8B by loading a program stored in the ROM 305 to the RAM

304 and executing it. The processing of this flowchart is started before the print medium is fed from the sheet feed port 107.

In S801, the CPU 303 starts the sheet mismatch determination process after determining in S605 that the printing apparatus-side sheet and the host-side sheet do not match. In S802, the CPU 303 determines whether the printing is bordered printing. The CPU 303 proceeds to the process of S803 if determining that the printing is bordered printing (Yes), and proceeds to the process of S815 if determining that the printing is borderless printing (No). Specifically, the CPU 303 determines whether the sheet setting information obtained in S604 includes margin information with the printer control module 421. The CPU 303 determines that the printing is bordered printing if determining that the sheet setting information includes margin information. On the other hand, the CPU 303 determines that the printing is borderless printing if determining that the sheet setting information does not include margin information.

Figure 9A:
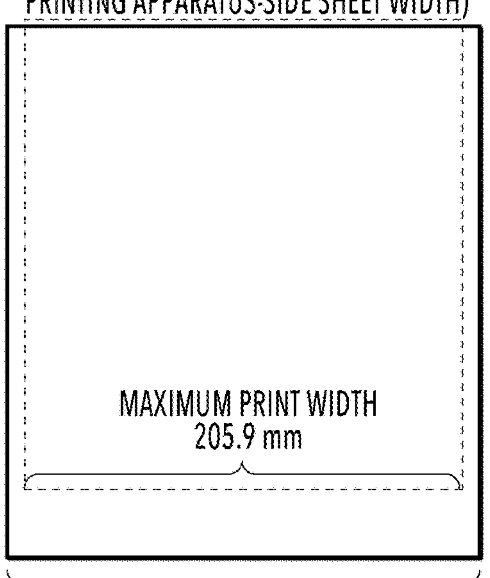
FIGS. 9A to 9D are diagrams illustrating an example of cases where printing is possible and cases where printing is impossible.
Figure 9B:
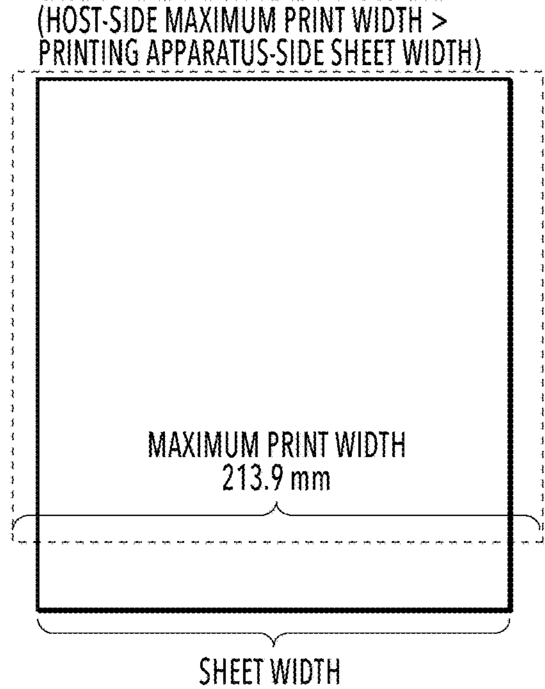

In S803, the CPU 303 compares the host-side maximum print width and the printing apparatus-side sheet width and determines whether the printing apparatus-side sheet width is larger. The CPU 303 proceeds to the process of S804 if determining that the printing apparatus-side sheet width is larger (Yes) and, if not (No), proceeds to the process of S805. Specifically, in a case as illustrated in FIG. 9A, the CPU 303 determines that the printing apparatus-side sheet width is larger than the host-side maximum print width. FIG. 9A is a diagram illustrating an example of a case where it is determined printing is possible in S803. A case of determining that printing is possible for bordered printing will now be described with reference to FIG. 9A. The substantially rectangular region depicted with the solid line in FIG. 9A represents the printing apparatus-side sheet size in a case where the sheet type is A4. The substantially rectangular region depicted with the dotted line in FIG. 9A is the largest printable region on the host side in a case where the sheet type is Letter. The printing apparatus-side sheet width in the horizontal direction of the sheet of FIG. 9A is 210 mm. The host-side maximum print width, on the other hand, is 205.9 mm. The maximum print width is calculated as follows. For example, in a case of bordered printing with a margin width of 5 mm set on the top, bottom, left, and right, the maximum print width is a value derived by subtracting the margin width of 5 mm on the left and right from a sheet width of 215.9 mm (215.9 mm−10 mm=205.9 mm). In other words, "host-side maximum print width<printing apparatus-side sheet width" is satisfied. Since the printable region fits within the printing apparatus-side sheet width, the printing can be performed normally. On the other hand, in a case as illustrated in FIG. 9B, the CPU 303 determines that the host-side maximum print width is larger than the printing apparatus-side sheet width. FIG. 9B is a diagram illustrating an example of a case where it is determined printing is impossible in S803. A case of determining that printing is impossible for bordered printing will now be described with reference to FIG. 9B. The substantially rectangular region depicted with the solid line in FIG. 9B represents the printing apparatus-side sheet size in a case where the sheet type is A4. The substantially rectangular region depicted with the dotted line in FIG. 9B is the largest printable region on the host side in a case where the sheet type is Letter. The printing apparatus-side sheet width in the horizontal direction of the sheet of FIG. 9B is 210 mm. The host-side maximum print width, on the other hand, is 213.9 mm. In FIG. 9B, a margin width of 1 mm is set on the top, bottom, left, and right by the bordered printing, unlike FIG. 9A. By applying the derivation equation mentioned above, 213.9 mm is obtained as the maximum print width. In other words, "host-side maximum print width>printing apparatus-side sheet width" is satisfied. Since the printable region does not fit within the printing apparatus-side sheet width, the printing cannot be performed normally. As described above, the CPU 303 makes a different determination according to the set margin width. Incidentally, in S803, the CPU 303 does not compare the sheet lengths of the host computer 313 and the printing apparatus 101. The CPU 303 does not compare the sheet lengths because it has already determined in S605 that the sheets for the host computer 313 and the printing apparatus 101 does not match, and does not therefore need to make a determination on the sheet lengths again.

Referring back to FIG. 8A, in S804, the CPU 303 sets the current status such that forced continuation is possible. Specifically, since the CPU 303 has determined in S803 that the printing can be performed normally with the sheet set for the printing apparatus 101, the CPU 303 sets the current status such that forced continuation, which allows printing even in a case where the printing apparatus-side sheet and the host-side sheet are different, is possible. The CPU 303 then proceeds to the process of S806. In S805, the CPU 303 sets the current status such that forced continuation is impossible. Specifically, since the CPU 303 has determined in S803 that the printing cannot be performed normally with the sheet set for the printing apparatus 101, the CPU 303 sets the current status such that forced continuation is impossible. The CPU 303 then proceeds to the process of S806.

Figure 9C:
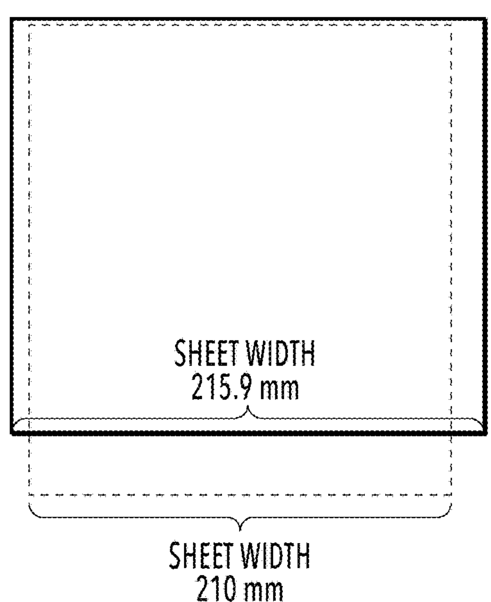
Figure 9D:
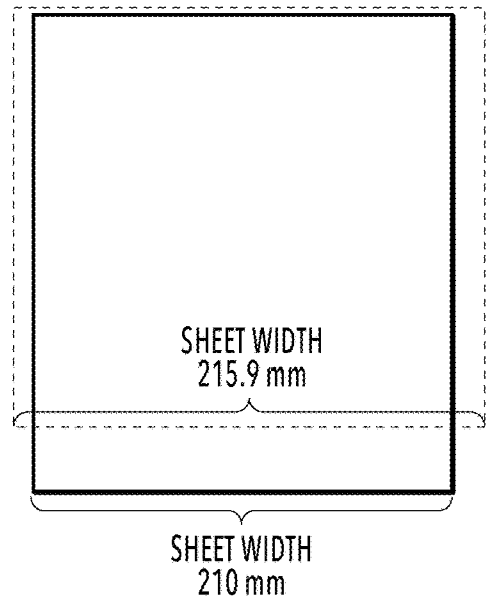

In S815, the CPU 303 compares the host-side sheet width and the printing apparatus-side sheet width and determines whether the printing apparatus-side sheet width is larger. Specifically, since the CPU 303 has determined in S802 that the printing is borderless printing, the CPU 303 performs the process of S815 with the host-side maximum printable width as the sheet width. The CPU 303 proceeds to the process of S816 if determining that the printing apparatus-side sheet width is larger (Yes) and, if not (No), proceeds to the process of S817. Specifically, in a case as illustrated in FIG. 9C, the CPU 303 determines that the printing apparatus-side sheet width is larger than the host-side sheet width. FIG. 9C is a diagram illustrating an example of a case where it is determined printing is possible in S815. A case of determining that printing is possible for borderless printing will now be described with reference to FIG. 9C. The substantially rectangular region depicted with the solid line in FIG. 9C represents the printing apparatus-side sheet size in a case where the sheet type is Letter. The substantially rectangular region depicted with the dotted line in FIG. 9C represents the host-side sheet size in a case where the sheet type is A4. The printing apparatus-side sheet width in the horizontal direction of the sheet of FIG. 9C is 215.9 mm. The host-side sheet width, on the other hand, is 210 mm. In other words, "host-side sheet width<printing apparatus-side sheet width" is satisfied. Since the printable region fits within the printing apparatus-side sheet width, the printing can be performed normally. On the other hand, in a case as illustrated in FIG. 9D, the CPU 303 determines that the host-side sheet width is larger than the printing apparatus-side sheet width. FIG. 9D is a diagram illustrating an example of a case where it is determined printing is impossible in S815. A case of determining that printing is impossible for borderless printing will now be described with reference to FIG. 9D. The substantially rectangular region depicted with the solid line in FIG. 9D represents the printing apparatus-side sheet size in a case where the sheet type is A4. The substantially rectangular region depicted with the dotted line in FIG. 9D represents the host-side sheet size in a case where the sheet type is Letter. The printing apparatus-side sheet width in the horizontal direction of the sheet of FIG. 9D is 210 mm. The host-side sheet width, on the other hand, is 215.9 mm. In other words, "host-side sheet width>printing apparatus-side sheet width" is satisfied. Since the printable region does not fit within the printing apparatus-side sheet width, the printing cannot be performed normally. As described above, the CPU 303 makes a different determination according to the sheet width.

Referring back to FIG. 8A, in S816, the CPU 303 sets the current status such that forced continuation is possible. Specifically, since the CPU 303 has determined in S815 that the printing can be performed normally with the sheet set for the printing apparatus 101, the CPU 303 sets the current status such that forced continuation is possible. The CPU 303 then proceeds to the process of S806. In S817, the CPU 303 sets the current status such that forced continuation is impossible. Specifically, since the CPU 303 has determined in S815 that the printing cannot be performed normally with the sheet set for the printing apparatus 101, the CPU 303 sets the current status such that forced continuation is impossible. The CPU 303 then proceeds to the process of S806.

In S806, the CPU 303 determines whether forced continuation is possible. The CPU 303 proceeds to the process of S807 if determining that forced continuation is possible (Yes) and, if not (No), proceeds to the process of S808. In S807, the CPU 303 displays a sheet mismatch screen. Specifically, the CPU 303 displays a display screen as illustrated in FIG. 10 on the operation unit 102. The CPU 303 then proceeds to the process of S809. FIG. 10 is a diagram illustrating an example of the sheet mismatch screen. The sheet mismatch screen displayed in the case where it is determined in S806 that forced continuation is possible will now be described with reference to FIG. 10. The sheet mismatch screen in FIG. 10 has a "print with the loaded sheets" button, a "change the sheets and print" button, and a "stop printing" button. The "print with the loaded sheets" button is a control that accepts forced continuation of the printing in response to being operated by the user. The "change the sheets and print" button is a control that accepts changing of the print medium by the user. The "stop printing" button is a control that accepts stopping of the printing. The user can select one of the controls to cause the printing apparatus 101 to execute a desired process. Note that the CPU 303 may send screen data of the sheet mismatch screen to the host computer 313 to display the sheet mismatch screen on the display unit of the host computer 313 and execute a process desired by the user. Then, from the host computer 313, the CPU 303 may receive information indicating a selected process corresponding to an operation on the display unit of the host computer 313. In this way, the user can cause the printing apparatus 101 to execute a process desired by the user from the host computer 313, without having to operate the operation unit 102 of the printing apparatus 101.

Referring back to FIG. 8A, in S808, the CPU 303 displays a sheet mismatch screen. Specifically, the CPU 303 displays a display screen as illustrated in FIG. 11 on the operation unit 102. The CPU 303 then proceeds to the process of S809. FIG. 11 is a diagram illustrating an example of the sheet mismatch screen. The sheet mismatch screen displayed in the case where it is determined in S806 that forced continuation is impossible will now be described with reference to FIG. 11. The sheet mismatch screen in FIG. 11 has a "change the sheets and print" button and a "stop printing" button. The "change the sheets and print" button and the "stop printing" button are as described above, and description thereof is therefore omitted. Since it has been determined in S806 that forced continuation is impossible, the "print with the loaded sheets" button displayed in the screen in FIG. 10 is not displayed in the sheet mismatch screen in FIG. 11. As described above, in the case where the current status is set such that forced continuation is impossible, the "print with the loaded sheets" button is not displayed as a choice in the display screen in FIG. 11 in order to keep the printing apparatus 101 from forcibly continuing the printing. Incidentally, as described in S807, the CPU 303 may sent screen data of the sheet mismatch screen to the host computer 313 and then receive information indicating a selected process from the host computer 313.

Referring back to FIG. 8B, in S809, the CPU 303 determines whether a control displayed in S807 or S808 is selected by the user's operation. The CPU 303 proceeds to the process of S810 if determining that a control is selected (Yes) and, if not (No), proceeds to the process of S809 again. Specifically, the CPU 303 continues the process of S809 until one of the controls displayed in the sheet mismatch screen in FIG. 10 or 11 is selected.

In S810, the CPU 303 determines whether forced continuation is selected. The CPU 303 proceeds to the process of S811 if determining that forced continuation is selected (Yes) and, if not (No), proceeds to the process of S812. Specifically, the CPU 303 proceeds to the process of S811 if determining that the "print with the loaded sheets" button in the sheet mismatch screen in FIG. 10 is pressed by the user's operation. On the other hand, the CPU 303 proceeds to the process of S812 if determining that the "change the sheets and print" button or the "stop printing" button in the sheet mismatch screen in FIG. 10 or 11 is pressed. In S811, the CPU 303 sets the current status such that the printing is possible and terminates the forced continuation determination process.

In S812, the CPU 303 determines whether changing the sheets is selected. The CPU 303 proceeds to the process of S813 if determining that changing the sheets is selected (Yes) and, if not (No), proceeds to the process of S814. Specifically, the CPU 303 proceeds to the process of S813 if the "change the sheets and print" button in the sheet mismatch screen in FIG. 10 or 11 is selected by the user's operation. On the other hand, the CPU 303 proceeds to the process of S814 if the "stop printing" button in the sheet mismatch screen in FIG. 10 or 11 is selected by the user's operation.

In S813, the CPU 303 determines whether the sheets have been changed. The CPU 303 proceeds to the process of S811 if determining that the sheets have been changed (Yes) and, if not (No), proceeds to the process of S813 again. In other words, the CPU 303 continues the process of S813 until the sheets are changed. As for the determination of whether the sheets have been changed, the CPU 303 determines that the sheets have been changed if there is an input from the user into the operation unit 102 or the display unit of the host computer 313 connected to the printing apparatus 101. In S814, the CPU 303 sets the current status such that the printing is impossible and terminates the forced continuation determination process.

As described above, in the embodiment of the present disclosure, printing can be performed as is in a case where the printing apparatus-side sheet width is larger than the host-side maximum print width. This increases the number of patterns with which printing is possible.

FIG. 12 is a table illustrating an example of patterns with which printing is possible through forced continuation of the printing. Patterns with which printing is possible in a case of bordered printing will be described with reference to FIG. 12. The second and third rows from the left in FIG. 12 are a list of sheet types which can be set on the printing apparatus 101 and a list of sheet widths corresponding to those sheet types. Also, the second and third rows from the top in FIG. 12 are a list of sheet types which can be set on the host computer 313 and a list of maximum print widths corresponding to those sheet types. Each circle in FIG. 12 represents a pattern with which printing has been conventionally possible. For example, one circle represents a pattern in a comparative example with which printing is possible even in a case where the sheet type set on the printing apparatus 101 is A4 and the sheet type set on the host computer 313 is B5, that is, the sheet types are different, regardless of whether borderless printing is set or bordered printing is set. Each double circle in FIG. 12 represents a pattern with which printing is possible through the forced continuation determination process by the printing apparatus 101 in the embodiment of the present disclosure. For example, one double circle represents a pattern with printing is possible when the sheet type set on the printing apparatus 101 is A4 and the sheet type set on the host computer 313 is Letter, unlike the comparative example. Note that the maximum print widths listed in FIG. 12 are set with a margin width of 3.4 mm on the left and right. Needless to say, the number of patterns with which printing is possible further increases as the margin width increases. In a case where the sheets loaded in the printing apparatus have a smaller sheet width than that of the actual sheet size that is desired to be used, the inks may contaminate the inside of the printing apparatus. Thus, printing can be kept from being executed. In this case, however, the patterns with which printing is possible are limited. On the other hand, forced continuation of printing increases the number of patterns with which printing is possible even in a case where the setting on the host side, which inputs print jobs, and the setting on the printing apparatus side are different.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-119722, filed Jul. 24, 2023, which is hereby incorporated by reference herein in its entirety.

What is claimed is:

1. A printing apparatus comprising:

at least one memory and at least one processor which function as an obtaining unit configured to obtain a print job including first sheet information and margin information from an information processing apparatus, the first sheet information indicating a dimension of a sheet to be used in printing, the margin information indicating whether to provide a margin region in the printing; and a determination unit configured to, in a case where the first sheet information and second sheet information indicating a dimension of a sheet set on the printing apparatus do not match, make a determination on whether the printing is possible based on region information indicating a printable region and the second sheet information, the printable region being based on the margin information.

2. The printing apparatus according to claim 1, wherein the first sheet information and the second sheet information each include sheet size information indicating a size of the sheet and sheet type information indicating a type of the sheet.

3. The printing apparatus according to claim 1, wherein the determination unit makes the determination in a case where the obtaining unit obtains the margin information indicating that a margin region is to be provided in the printing.

4. The printing apparatus according to claim 1, wherein the margin information includes information indicating a width of the margin region.

5. The printing apparatus according to claim 1, wherein the determination unit makes the determination by comparing a print width of the printable region and a sheet width included in the second sheet information.

6. The printing apparatus according to claim 5, wherein the determination unit determines that the printing is possible in a case where the sheet width is larger than the print width.

7. The printing apparatus according to claim 6, wherein the determination unit determines that the printing is impossible in a case where the sheet width is smaller than the print width.

8. The printing apparatus according to claim 1, further comprising a display unit configured to display a control that accepts continuation of the printing in a case where the determination unit determines that the printing is possible.

9. The printing apparatus according to claim 8, wherein the determination unit determines that the printing is possible in a case where the control is selected.

10. The printing apparatus according to claim 1, further comprising a sending unit configured to send screen data for displaying a control that accepts continuation of the printing to the information processing apparatus in a case where the determination unit determines that the printing is possible.

11. A method of controlling a printing apparatus, the method comprising:

obtaining a print job including first sheet information and margin information from an information processing apparatus, the first sheet information indicating a dimension of a sheet to be used in printing, the margin information indicating whether to provide a margin region in the printing; and in a case where the first sheet information and second sheet information indicating a dimension of a sheet set on a printing apparatus do not match, making a determination on whether the printing is possible based on region information indicating a printable region and the second sheet information, the printable region being based on the margin information.

12. A non-transitory computer-readable storage medium storing a program for causing a computer to perform:

obtaining a print job including first sheet information and margin information from an information processing apparatus, the first sheet information indicating a dimension of a sheet to be used in printing, the margin information indicating whether to provide a margin region in the printing; and in a case where the first sheet information and second sheet information indicating a dimension of a sheet set on a printing apparatus do not match, making a determination on whether the printing is possible based on region information indicating a printable region and the second sheet information, the printable region being based on the margin information.

* * * * *